(12) United States Patent
Smith et al.

(10) Patent No.: US 8,991,351 B2
(45) Date of Patent: Mar. 31, 2015

(54) NEEDLE ROLLER CAM FOLLOWER FOR HIGHER MILEAGE APPLICATIONS OF LIGHT, MEDIUM AND HEAVY DUTY VEHICLES

(71) Applicant: Roller Bearing Company of America, Inc., Oxford, CT (US)

(72) Inventors: Kelvin Smith, New Hartford, CT (US); Brett Blauner, Valparaiso, IN (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/211,916

(22) Filed: Mar. 14, 2014

(65) Prior Publication Data
US 2014/0261269 A1    Sep. 18, 2014

Related U.S. Application Data

(60) Provisional application No. 61/789,036, filed on Mar. 15, 2013.

(51) Int. Cl.
*F01L 1/18* (2006.01)
*F01L 1/14* (2006.01)
(Continued)

(52) U.S. Cl.
CPC ... *F01L 1/14* (2013.01); *F01L 1/18* (2013.01); *F01L 1/185* (2013.01); *F16C 19/44* (2013.01);
(Continued)

(58) Field of Classification Search
CPC ............. F01L 1/18; F01L 1/185; F16C 19/44
USPC .............. 123/90.44, 90.48; 74/569; 384/548, 384/553, 593
See application file for complete search history.

(56) References Cited

U.S. PATENT DOCUMENTS

| | | |
|---|---|---|
| 3,096,565 A | 7/1963 | Cerness et al. |
| 4,727,832 A | 3/1988 | Miyamura et al. |

(Continued)

FOREIGN PATENT DOCUMENTS

| | | |
|---|---|---|
| EP | 1788264 A1 | 5/2007 |
| JP | 2002031212 A | 1/2000 |

(Continued)

OTHER PUBLICATIONS

International Search Report from corresponding PCT Application No. PCT/US2014/027954, dated Sep. 1, 2014.

(Continued)

*Primary Examiner* — Ching Chang
(74) *Attorney, Agent, or Firm* — MKG, LLC

(57) ABSTRACT

A roller assembly for a diesel engine used in a high mileage vehicle includes a roller having an exterior roller surface and an interior surface that defines a bore extending therethrough. A pin is positioned in the bore and defines an exterior pin surface. A plurality of rolling elements is positioned between the exterior pin surface and the roller interior surface. Each of the rolling elements rollingly engages the exterior pin surface and the roller interior surface. The roller assembly defines a clearance of between about 0.01 mm to about 0.03 mm between the rolling elements, the exterior pin surface and the interior surface. The roller assembly is configured to achieve extended life criteria wherein the clearance does not increase to more than 0.02 mm to 0.06 mm after 500,000 miles of travel of a vehicle powered by a diesel engine having the roller assembly installed therein.

15 Claims, 4 Drawing Sheets

(51) Int. Cl.
*F16C 19/44* (2006.01)
*F01L 1/12* (2006.01)

(52) U.S. Cl.
CPC .. *F01L 1/12* (2013.01); *F01L 1/181* (2013.01); *F01L 2105/00* (2013.01); *F01L 2105/02* (2013.01)
USPC ....... 123/90.44; 123/90.48; 74/569; 384/548; 384/553; 384/593

(56) References Cited

U.S. PATENT DOCUMENTS

| | | | |
|---|---|---|---|
| 5,531,137 | A | 7/1996 | Guilford |
| 5,931,133 | A | 8/1999 | Giannone et al. |
| 5,960,758 | A | 10/1999 | Giannone et al. |
| 6,095,013 | A | 8/2000 | Hashimoto et al. |
| 6,210,503 | B1 | 4/2001 | Naylor et al. |
| 6,289,765 | B1 | 9/2001 | Clayson |
| 7,614,374 | B2 * | 11/2009 | Watanabe et al. .......... 123/90.39 |
| 8,021,053 | B2 | 9/2011 | Habibvand |
| 8,070,364 | B2 | 12/2011 | Beer et al. |
| 8,132,964 | B2 | 3/2012 | Gyuricsko et al. |
| 8,215,845 | B2 | 7/2012 | Habibvand |
| 2002/0000214 | A1 | 1/2002 | Harimoto |
| 2005/0274437 | A1 | 12/2005 | Engelhardt et al. |
| 2007/0006944 | A1 | 1/2007 | Waseda et al. |
| 2009/0050091 | A1 | 2/2009 | Watanabe et al. |
| 2009/0175567 | A1 | 7/2009 | Prescavage et al. |
| 2009/0276992 | A1 | 11/2009 | Maeda et al. |
| 2010/0319642 | A1 | 12/2010 | Fujita et al. |
| 2011/0088506 | A1 | 4/2011 | Oishi et al. |
| 2012/0037278 | A1 | 2/2012 | Beer et al. |
| 2012/0291736 | A1 | 11/2012 | Moeck |
| 2013/0195392 | A1 | 8/2013 | Gibbons |

FOREIGN PATENT DOCUMENTS

| | | |
|---|---|---|
| JP | 2000038907 A | 2/2000 |
| JP | 2000145791 A | 5/2000 |
| JP | 2002188643 A | 7/2002 |
| JP | 2003222006 A | 8/2003 |
| JP | 2003328706 A | 11/2003 |
| JP | 2004162887 A | 6/2004 |
| JP | 2004183589 A | 7/2004 |
| JP | 2004263584 A | 9/2004 |
| JP | 2004278322 A | 10/2004 |
| JP | 2005030569 A | 2/2005 |
| JP | 2006071006 A | 3/2006 |
| JP | 2006194139 A | 7/2006 |
| JP | 2008115837 A | 5/2008 |
| JP | 2009221593 A | 10/2009 |
| JP | 2009257566 A | 11/2009 |
| JP | 2010112340 A | 5/2010 |
| JP | 2010168922 A | 8/2010 |
| WO | 2009104498 A1 | 8/2009 |
| WO | 2009116269 A1 | 9/2009 |

OTHER PUBLICATIONS

Engineering for Airframe Control Needle Roller Bearings, http://www.rbcbearings.com/aero-pdfs/Rolling/064_088/Ndl_AFC_Engin.pdf, Jan. 1, 2008.

* cited by examiner

NEEDLE ROLLER CAM FOLLOWER FOR HIGHER MILEAGE APPLICATIONS OF LIGHT, MEDIUM AND HEAVY DUTY VEHICLES

CROSS-REFERENCE TO RELATED APPLICATION

This application claims the benefit of U.S. Provisional Patent Application Ser. No. 61/789,036, filed on Mar. 15, 2013, which is incorporated herein by reference in its entirety.

FIELD OF THE INVENTION

The present invention relates generally to needle roller cam follower bearings, and more particularly to needle roller cam follower bearings for diesel engines used in higher mileage applications of light, medium and heavy duty vehicles.

BACKGROUND OF THE INVENTION

Known bearings include various means for guiding and positioning rollers. Bearing types include journal bearings wherein a shaft is rotatably supported by an outer ring. Journal bearings typically require a lubricant (e.g., high pressure oil) to be pumped between and around the shaft and an interior surface defined by the outer ring. Needle roller bearings are another type of bearing. Needle roller bearings have a plurality of cylindrical shaped rolling elements, generally referred to as needles, disposed between the shaft and the interior surface defined by the outer ring. Thus the shaft is rotatably supported by the needles. Needle roller bearings require less lubricant than journal bearings. Needle roller bearings also operate at lower friction levels than comparably sized journal bearings. However, needle roller bearings have higher contact pressures on the shaft at the rolling interface with the needles. Thus the operating life of needle roller bearings is generally less than comparably sized journal bearings. Needle roller bearings are easily contaminated by debris such as byproducts of combustion generated in an engine. Such byproducts are abrasive and can cause wear and premature failure of the needle roller bearing.

Roller bearings can be used for reducing friction between components of engines. For example, tappet roller bearings can be incorporated into an engine valve drive mechanism for minimizing friction of the valve drive mechanism components. In general, to reduce friction on an engine and thus reduce fuel consumption, tappet roller bearings are fitted to the mechanism which changes the rotation of a cam shaft synchronized with an engine crank shaft into the reciprocal drive for the intake valve and exhaust valve.

Diesel engines such as those used in higher mileage applications of light, medium and heavy duty vehicles typically use journal type bearings in cam follower applications because of their ability to operate without significant wear for over 250,000 miles to as much as one million miles of operation. However, journal bearings require a pumped supply of high pressure lubricating oil to operate in such applications. There has been a long felt and unfulfilled need for lower friction cam follower bearings for use in such higher mileage applications. However, despite significant efforts, those skilled in the relevant art have been unable to design a needle roller bearing that has a sufficient life suitable for use in diesel engines for such higher mileage applications.

SUMMARY

According to aspects illustrated herein there is provided a roller assembly for a diesel engine used in a high mileage vehicle, the roller assembly comprising: a roller having an exterior roller surface and an interior surface that defines a bore extending therethrough; a pin positioned in the bore and defining an exterior pin surface; and a plurality of rolling elements positioned between the exterior pin surface and the interior surface of the roller, each of the plurality of rolling elements rollingly engages the exterior pin surface and the interior surface of the roller; the roller assembly defines a clearance of between about 0.01 mm to about 0.03 mm between the rolling elements, the exterior pin surface and the interior surface; and the roller assembly is configured to achieve extended life criteria for the diesel engines used in the high mileage vehicles, the extended life criteria comprises the clearance not increasing to more than 0.02 mm to 0.06 mm after 500,000 miles of travel of a vehicle powered by a diesel engine having the roller assembly installed therein.

According to other aspects illustrated herein there is provided a cam and follower assembly for a diesel engine used in a high mileage commercial vehicle, the cam and follower assembly comprising: a cam mounted on a cam shaft, the cam defining an exterior cam surface; a follower assembly including a housing having a roller assembly rotatably mounted therein; the roller assembly comprising, a roller having an exterior roller surface and an interior surface that defines a bore extending therethrough, the exterior roller surface engaging the exterior cam surface, a pin positioned in the bore and defining an exterior pin surface, and a plurality of rolling elements positioned between the exterior pin surface and the interior surface of the roller, each of the plurality of rolling elements rollingly engages the exterior pin surface and the interior surface of the roller, the roller assembly defines a clearance of between about 0.01 mm to about 0.03 mm between the rolling elements, the exterior pin surface and the interior surface, and the roller assembly is configured to achieve extended life criteria for the diesel engines used in the high mileage vehicles, the extended life criteria comprises the clearance not increasing to more than 0.02 mm to 0.06 mm after 500,000 miles of travel of a vehicle powered by a diesel engine having the roller assembly installed therein; and wherein the follower assembly is configured to achieve extended life criteria for diesel engines used in higher mileage vehicles.

DETAILED DESCRIPTION OF THE INVENTION

Figure 1:
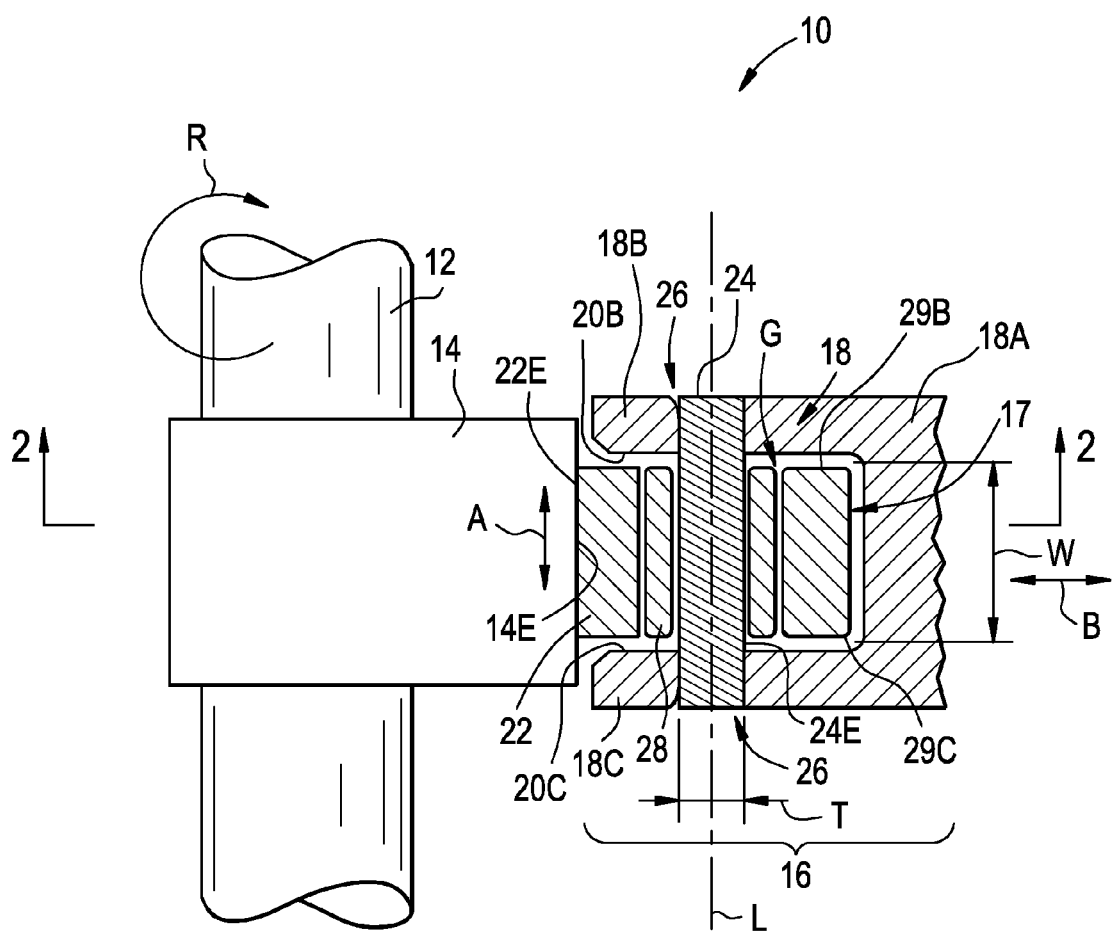
FIG. 1 is a cross-sectional elevation view of a portion of a cam and follower assembly in accordance with one embodiment of the present invention.
Figure 2:
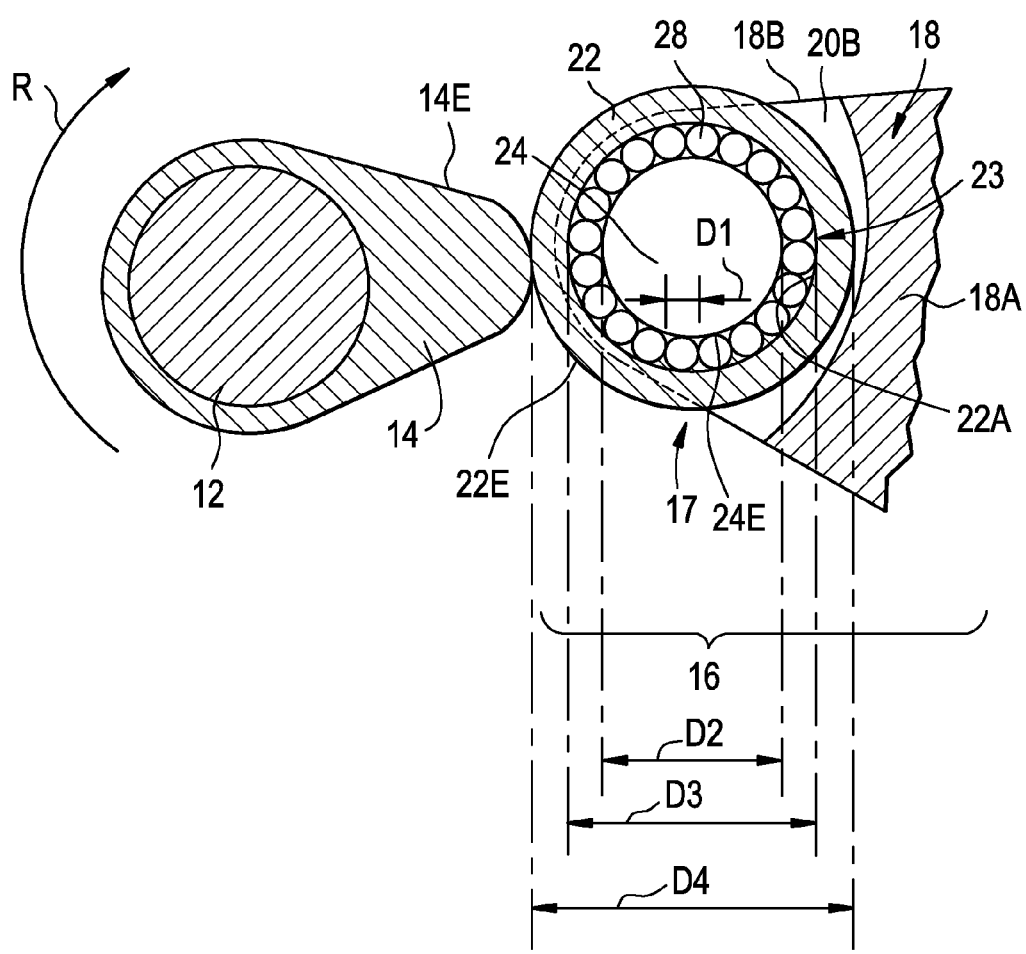
FIG. 2 is a cross sectional view of the cam and follower assembly of FIG. 1, taken across line 2-2.
Figure 4:
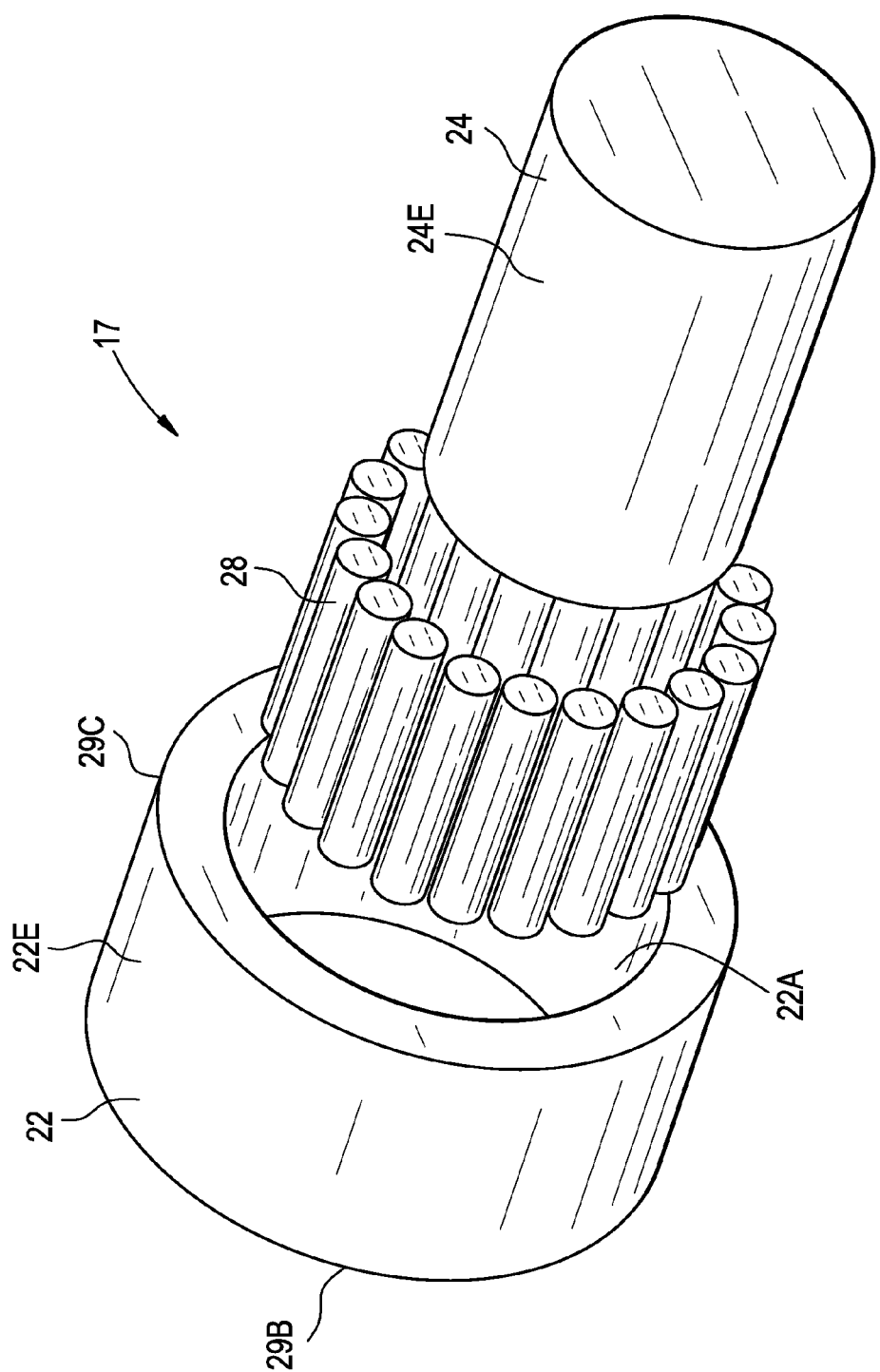
FIG. 4 is an exploded view of the roller sub-assembly of FIG. 1.

In reference to FIGS. 1, 2 and 4, a cam and follower assembly for use in a large diesel engine such as that used in higher mileage applications of light, medium and heavy duty vehicles is generally designated by the numeral 10. The cam and follower assembly 10 includes a cam shaft 12 with a cam 14 positioned thereon. The cam 14 defines an exterior cam surface 14E which rollingly engages a roller (e.g., cam follower) as described below. The cam and follower assembly 10 includes a follower assembly 16 that is in moving relation to the cam 14. The cam and follower assembly 10 of the present invention is designed and configured for use in large diesel engines installed in Class 1-3 vehicles (i.e., light duty vehicles), Class 4-6 vehicles (i.e., medium duty vehicles), and Class 7-8 vehicles (i.e., heavy duty vehicles).

The follower assembly 16 includes a housing 18 with a roller sub-assembly 17 rotatably positioned therein as described below. A portion of the housing 18 is shown cut off for illustrative purposes. The housing 18 has a base portion 18A and has two prongs 18B and 18C extending from the base portion 18A in a forked configuration. The prongs 18B and 18C are spaced apart from one another thereby defining a gap G therebetween. The gap G is positioned between an inwardly facing wall 20B of the prong 18B and an inwardly facing wall 20C of the prong 18C. The prong 18B and the prong 18C each have a bore 26 extending therethrough such that the bores 26 are concentric with one another.

As shown in FIGS. 1 and 2, the roller sub-assembly 17 includes a roller 22 (e.g., a cam follower) rotatably mounted on a pin 24 with a plurality of rolling elements 28 rotatably positioned therebetween as described below. Each of the rolling elements 28 defines an outer diameter D1. The pin 24 defines an exterior surface 24E having an outer diameter D2. The roller 22 has a bore 23 therethrough defining an interior surface 22A having an inner diameter D3, also referred to herein as a bore diameter D3. The roller 22 also defines an exterior surface 22E having an outer diameter D4. The plurality of rolling elements 28 rollingly engage the exterior surface 24E defined by the pin 24 and the interior surface 22A defined by the roller 22. The exterior surface 22E defined by the roller 22 rollingly engages the cam surface 14E of the cam 14 to move the housing 18 to open and close intake and exhaust valves (not shown) at timed intervals. Opposing ends of the pin 24 are secured in the bores 26 of each of the prongs 18B and 18C, with suitable means such as by staking, pinning, and the like.

As illustrated in FIG. 1, the roller sub-assembly 17 and the roller 22 included therein extend a width W in an axial direction along an axis L, between a first end face 29B and a second end face 29C defined by the roller 22. During operation, the roller 22 rotates around the pin 24 and thrusts axially along the axis L. Axial movement of the roller 22 is limited by the inwardly facing wall 20B of the prong 18B and the inwardly facing wall 20C of the prong 18C. Thus the first end face 29B slidingly engages the inwardly facing wall 20B of the prong 18B, and the second end face 29C slidingly engages the inwardly facing wall 20C of the prong 18C.

The design of the pin 24, rolling elements 28 and roller 22 is optimized for dynamic load rating and roller bending stress. A roller 22 having a maximum bore diameter D3 maximizes the dynamic load rating of the roller sub-assembly 17. However, the bore diameter D3 is limited by the bending stress in the roller 22 caused by loads applied thereto by the rolling elements 28. The number of rolling elements 28 affects the bending stress in the roller, wherein increasing the number of rolling elements 28 reduces the bending stress. The pin 24 is subject to the highest rolling element contact pressures because there is a diverging contact between the pin 24 and the rolling elements 28. The life of the pin 24 is lowest because the load is stationary with regard to the pin 24. Abrasive wear and potential spalling of the pin 24 are minimized by use of suitable materials as described herein.

The inventor has discovered that a roller sub-assembly 17 having dimensions and being made from materials described herein is able to achieve extended life criteria for diesel engines used in higher mileage applications of light, medium and heavy duty vehicles powered by diesel engines. In one embodiment, the extended life criteria requires that the clearance of about 0.01 mm to about 0.03 mm between the rolling elements 28, the exterior pin surface 24E and the interior surface 22A does not increase to more than 0.02 mm to 0.06 mm after 250,000 miles of travel of a vehicle powered by a diesel engine having the roller sub-assembly 17 installed therein. In one embodiment, the extended life criteria requires that the clearance of between about 0.01 mm to about 0.03 mm does not increase to more than 0.02 mm to 0.06 mm after 1,000,000 miles of travel of a vehicle powered by a diesel engine having the roller sub-assembly 17 installed therein.

In one embodiment, the extended life criteria requires that the exterior surface 24E of the pin 24 has no spalling, for example, no visible or measureable spalling after 250,000 miles of travel of a vehicle powered by a diesel engine having the roller sub-assembly 17 installed therein. In one embodiment, the extended life criteria requires that the exterior surface 24E of the pin 24 has no spalling, for example, no visible or measureable spalling after 1,000,000 miles of travel of a vehicle powered by a diesel engine having the roller sub-assembly 17 installed therein.

Design of the roller sub-assembly 17 is limited by the internal geometry of the diesel engine. The outer diameter D4 of the roller 22, and the width W of the roller sub-assembly 17 are fixed. Therefore, the inner diameter D3 of the roller 22, the outer diameter D2 of the pin 24 and the outer diameter D1 of the rolling elements 28 are optimized for all engine geometries, in particular to optimize a radial thickness T (i.e., (D4-D3)/2) of the roller 22 (FIG. 1) while the outer diameter D1 of the rolling elements 28 is optimized in order to increase the capacity/life (e.g., dynamic load rating) of the roller sub-assembly 17. In one embodiment, the radial thickness T is between about one to two times the outer diameter D1 of the rolling elements 28.

Figure 3:
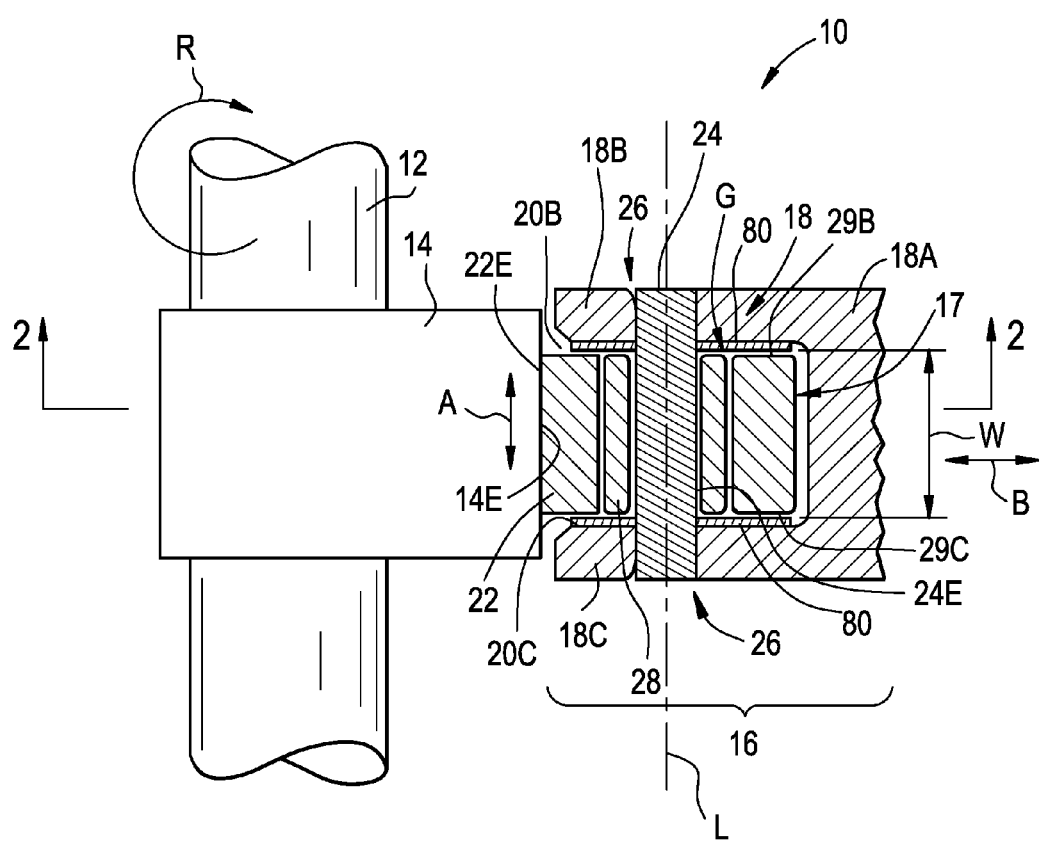
FIG. 3 is a cross sectional elevation view of a portion of a cam and follower assembly in accordance with another embodiment of the present invention having a thrust washer.

The inventor has conducted several hundred hours of analysis (e.g., computational analysis) and experimental testing (e.g., rotational load testing in a test rig) to arrive at the roller sub-assembly 17 disclosed herein. While, there is an almost infinite number of combinations of materials that could be used for the roller 22, the pin 24, the rolling elements 28 and the housing 18, the inventor has identified several novel and non-obvious combinations of materials that achieve the extending life criteria disclosed above. For example, in one non-limiting embodiment, the pin 24 is manufactured from M50 VIM-VAR (i.e., Vacuum Induction Melt and Vacuum Arc Remelted) per AMS 6491 with a nitriding surface treatment; the roller 22 is manufactured from SAE 52100 per AMS 6440; the rolling elements 28 are manufactured from SAE 52100 per AMS 6440 with carbonitriding surface hardening. The housing 18 is manufactured from a hardenable material. In one embodiment and as shown in FIG. 3, a hardened thrust washer 80 is positioned between the inwardly facing wall 20B of the prong 18B and the first end face 29B of the roller 22; and another hardened thrust washer 80 is positioned between the inwardly facing wall 20C of the prong 18C and the second end face 29C of the roller 22. One of the washers 80 is secured to each of the inwardly facing wall 20B and the inwardly facing wall 20C, thereby preventing rotation of the washer 80 in relation to the inwardly facing wall 20B and the inwardly facing wall 20C and eliminating the need to have a hardened surface on the inwardly facing wall 20B and the inwardly facing wall 20C.

In one embodiment, the pin 24 is manufactured from M50 VIM-VAR (i.e., Vacuum Induction Melt and Vacuum Arc Remelted) per AMS 6491 with a nitriding surface treatment. While the pin 24 is described as being manufactured from M50 VIM-VAR per AMS 6491 with a nitriding surface treatment, the present invention is not limited in this regard as the pin 24 may be manufactured from other suitable materials, including but not limited to: a) standard SAE 52100 material (AMS 6440); b) AMS 6440, AMS 6444 52100 Vacuum Arc Remelted (VAR); c) AMS 6444 VAR 52100 made with a Vacuum Induction Melt (VIM) step; or d) 8620. In one embodiment, the pin 24 is manufactured using other processing including, but not limited to carburizing the 8620, carbonitriding, nitriding, or solution nitriding.

In one embodiment, the roller 22 is manufactured from SAE 52100 per AMS 6440. While the roller 24 is described as being manufactured from SAE 52100 per AMS 6440, the present invention is not limited in this regard as the roller 22 may be manufactured from other suitable materials, including but not limited to: a) AMS 6440, AMS 6444 52100 Vacuum Arc Remelted (VAR); b) AMS 6444 VAR 52100 adding a Vacuum Induction Melt (VIM) step; c) 8620; or d) M50. In one embodiment, the roller 22 is manufactured using other processing including, but not limited to carburizing the 8620, carbonitriding, nitriding, or solution nitriding.

In one embodiment, the rolling elements 28 are manufactured from SAE 52100 per AMS 6440 with carbonitriding surface hardening. While the rolling elements 28 are described as being manufactured from SAE 52100 per AMS 6440 with carbonitriding surface hardening, the present invention is not limited in this regard as the rolling elements may be manufactured from other suitable materials, including but not limited to: a) AMS 6440, AMS 6444 52100 Vacuum Arc Remelted (VAR); b) AMS 6444 VAR 52100 adding a Vacuum Induction Melt (VIM) step; or c) M50. In one embodiment, the roller 22 is manufactured using other processing including, but not limited to carburizing the 8620, carbonitriding, nitriding, or solution nitriding.

In one embodiment, the housing 18 is manufactured from a hardenable iron or steel for, example, but not limited to SAE 52100 steel and is through hardened, for example, by induction hardening. In one embodiment, the housing 18 is manufactured from a case hardenable steel, for example, but not limited to SAE 8620H steel and is surface hardened, for example, but not limited to carburizing or hardening. In one embodiment, the housing 18 is manufactured from a case hardenable steel, for example, but not limited to SAE 8620H steel and is surface hardened. For example, in this embodiment, the housing is carburized and hardened to reach a minimum hardness of Rockwell C 50. In one embodiment, the hardening of the housing 18 is accomplished by direct quench, induction, laser or other means. In one embodiment, only the inwardly facing wall 20B of the prong 18B and the inwardly facing wall 20C of the prong 18C are induction hardened. In one embodiment, only the inwardly facing wall 20B of the prong 18B and the inwardly facing wall 20C of the prong 18C are surface hardened with the laser treatment. While the housing 18 and/or the inwardly facing wall 20B and the inwardly facing wall 20C are described as being manufactured from SAE 52100 steel or SAE 8620H steel and induction hardened or surface hardened, the present invention is not limited in this regard as the housing 18 and the inwardly facing wall 20B and the inwardly facing wall 20C may be manufactured from other materials and/or treated by other processes including but not limited to through hardening to at least Rockwell C 50 via induction hardening methods and surface hardening via laser hardening or carburizing techniques.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A roller assembly for a diesel engine used in a high mileage vehicle, the roller assembly comprising:
    a roller having an exterior roller surface and an interior surface that defines a bore extending therethrough;
    a pin positioned in the bore and defining an exterior pin surface; and
    a plurality of rolling elements positioned between the exterior pin surface and the interior surface of the roller, each of the plurality of rolling elements rollingly engages the exterior pin surface and the interior surface of the roller;
    the roller assembly defines a clearance of between 0.01 mm to 0.03 mm between the rolling elements, the exterior pin surface and the interior surface; and
    the roller assembly is configured to achieve extended life criteria for diesel engines used in the high mileage vehicles, the extended life criteria comprises the clearance not increasing to more than 0.02 mm to 0.06 mm after 500,000 miles of travel of a vehicle powered by a diesel engine having the roller assembly installed therein.

2. The roller assembly of claim 1, wherein:
    the pin is manufactured from one of M50 VIM-VAR per AMS 6491 with a nitriding surface treatment, SAE 52100 per AMS 6440 with a carbonitriding surface hardening, or SAE 52100 per AMS 6440 induction hardened with a carbonitriding surface hardening.

3. The roller assembly of claim 1, wherein:
    the roller is manufactured from SAE 52100 per AMS 6440.

4. The roller assembly of claim 1, wherein:
    the rolling elements are manufactured from SAE 52100 per AMS 6440 with carbonitriding surface hardening.

5. The roller assembly of claim 1, wherein:
    the pin is manufactured from one of M50 VIM-VAR per AMS 6491 with a nitriding surface treatment, SAE 52100 per AMS 6440 with a carbonitriding surface hardening, or SAE 52100 per AMS 6440 induction hardened with a carbonitriding surface hardening;
    the roller is manufactured from SAE 52100 per AMS 6440; and
    the rolling elements are manufactured from SAE 52100 per AMS 6440 with carbonitriding surface hardening.

6. The roller assembly of claim 1, wherein;
    each of the rolling elements have a first diameter;
    the roller defines a roller inner diameter and a roller outer diameter and a defines a radial thickness equal to one half of the roller outside diameter minus one half of the roller inside diameter; and
    wherein the radial thickness is between about one to two times the first diameter.

7. A cam and follower assembly for a diesel engine used in a high mileage commercial vehicle, the cam and follower assembly comprising:
    a cam mounted on a cam shaft, the cam defining an exterior cam surface;

a follower assembly including a housing having a roller assembly rotatably mounted therein;

the roller assembly comprising, a roller having an exterior roller surface and an interior surface that defines a bore extending therethrough, the exterior roller surface engaging the exterior cam surface, a pin positioned in the bore and defining an exterior pin surface, and a plurality of rolling elements positioned between the exterior pin surface and the interior surface of the roller, each of the plurality of rolling elements rollingly engages the exterior pin surface and the interior surface of the roller, the roller assembly defines a clearance of between 0.01 mm to 0.03 mm between the rolling elements, the exterior pin surface and the interior surface, and the roller assembly is configured to achieve extended life criteria for the diesel engines used in the high mileage vehicles, the extended life criteria comprises the clearance not increasing to more than 0.02 mm to 0.06 mm after 500,000 miles of travel of a vehicle powered by a diesel engine having the roller assembly installed therein; and wherein the follower assembly is configured to achieve extended life criteria for diesel engines used in higher mileage vehicles.

8. The cam and follower assembly of claim 7, wherein:
the housing is manufactured from a hardenable steel and is surface hardened to at least Rockwell C 50.

9. The cam and follower assembly of claim 8, wherein a portion of the housing is surface hardened.

10. The cam and follower assembly of claim 7, wherein:
the pin is manufactured from M50 VIM-VAR per AMS 6491 with a nitriding surface treatment.

11. The cam and follower assembly of claim 7, wherein:
the roller is manufactured from SAE 52100 per AMS 6440.

12. The cam and follower assembly of claim 7, wherein:
the rolling elements are manufactured from SAE 52100 per AMS 6440 with carbonitriding surface hardening.

13. The cam and follower assembly of claim 7, wherein:
the pin is manufactured from M50 VIM-VAR per AMS 6491 with a nitriding surface treatment;
the roller is manufactured from SAE 52100 per AMS 6440;
the rolling elements are manufactured from SAE 52100 per AMS 6440 with carbonitriding surface hardening; and
the housing is manufactured from material hardenable to at least Rockwell C 50.

14. The cam and follower assembly of claim 13, wherein a portion of the housing is surface hardened.

15. The cam and follower assembly of claim 7, wherein:
a thrust washer is disposed between the roller and the housing.

* * * * *